United States Patent [19]
Maerfeld

[11] Patent Number: 4,694,700
[45] Date of Patent: Sep. 22, 1987

[54] ULTRASONIC SENSOR FOR ELECTRONIC SECTORIAL SCANNING AND ECHOGRAPH INCORPORATING SUCH A SENSOR

[75] Inventor: Charles Maerfeld, Antibes, France

[73] Assignee: CGR Ultrasonic, Paris, France

[21] Appl. No.: 779,855

[22] Filed: Sep. 25, 1985

[30] Foreign Application Priority Data

Sep. 25, 1984 [FR] France ................... 84 14708

[51] Int. Cl.⁴ .............................................. G01N 29/04
[52] U.S. Cl. ........................................ 75/628; 73/626; 73/625; 128/660
[58] Field of Search ............... 73/628, 626, 625; 128/660

[56] References Cited

U.S. PATENT DOCUMENTS

| | | | |
|---|---|---|---|
| 4,030,343 | 6/1977 | Lund et al. ............... | 73/626 |
| 4,070,905 | 1/1978 | Kossoff .................. | 73/614 |
| 4,103,677 | 8/1978 | Lansiart et al. .......... | 73/625 |
| 4,200,858 | 4/1980 | Takashima .............. | 73/626 |
| 4,276,779 | 7/1981 | Davis et al. ............. | 73/626 |

FOREIGN PATENT DOCUMENTS 2711098 9/1978 Fed. Rep. of Germany .
2332531 6/1977 France .

OTHER PUBLICATIONS

"Ultrasonic Beam Scanner", Patent Abstracts of Japan, vol. 6, No. 38, (p. 105), 1982, Matsushita et al.

*Primary Examiner*—Anthony V. Ciarlante
*Attorney, Agent, or Firm*—Cushman, Darby & Cushman

[57] ABSTRACT

Ultrasonic sensor and echograph with static sectorial scanning, especially for a wide angle picture, wherein according to a possible embodiment, the sensor comprises several groups of transducer elements forming between one another obtuse angles in such a way as to define overall a convex outline so that the delays or lags necessary to obtain a complete scanning be lower than with a conventional linear strip and thus easier to contol, the sensor being intended to be applied to medical echography.

17 Claims, 6 Drawing Figures

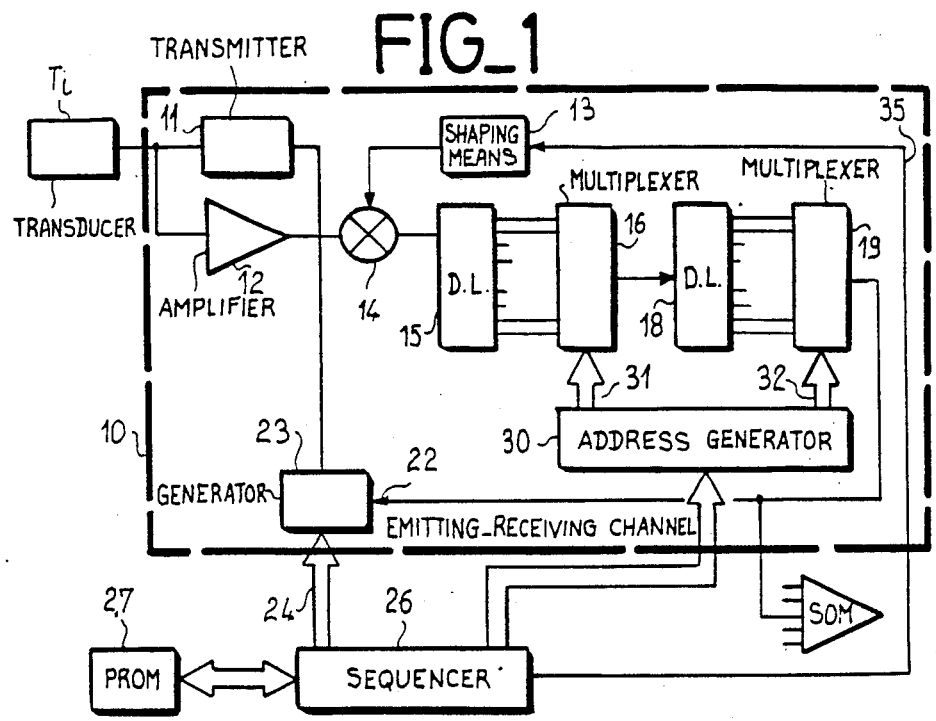
FIG_1
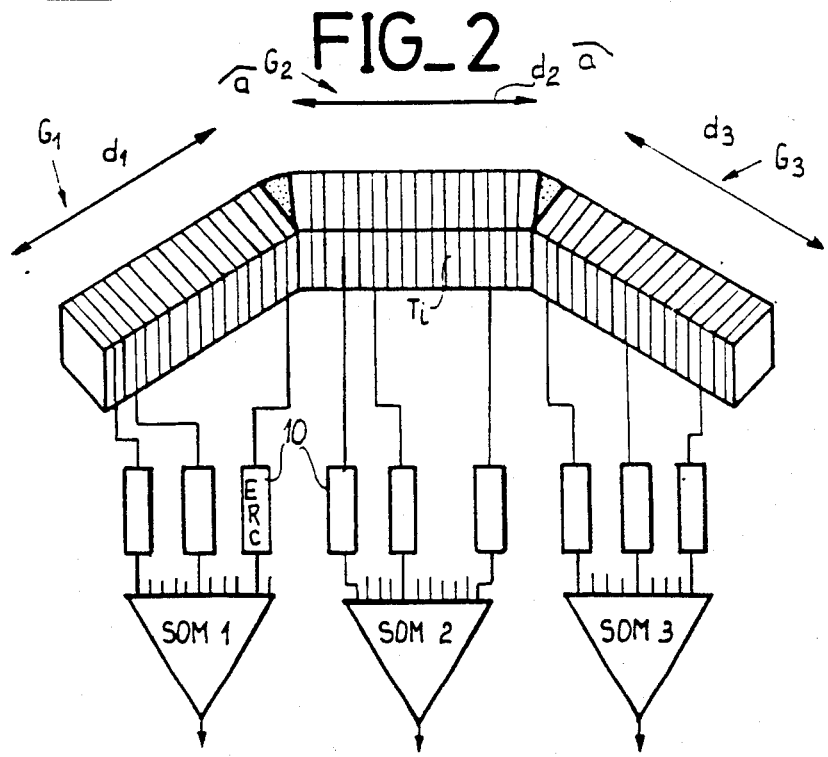
FIG_2

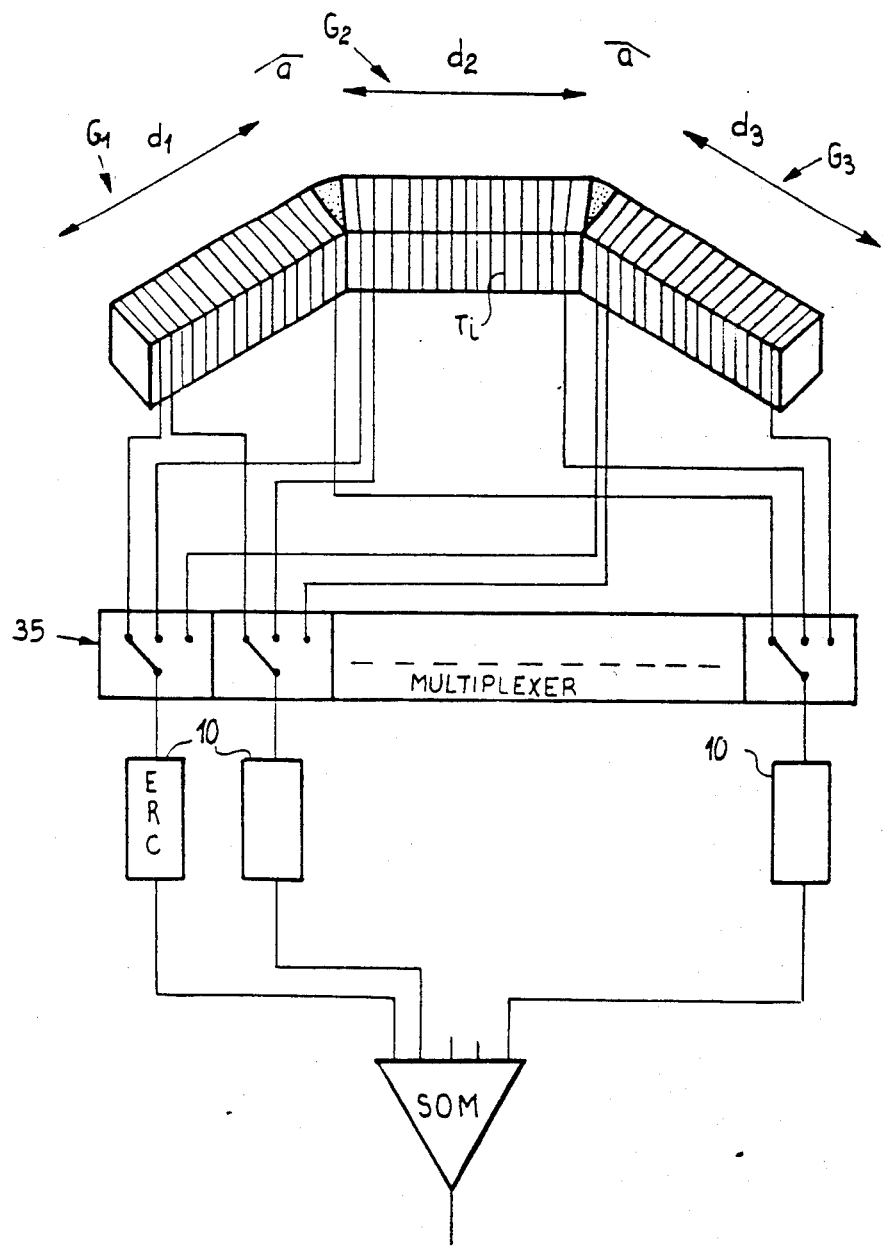

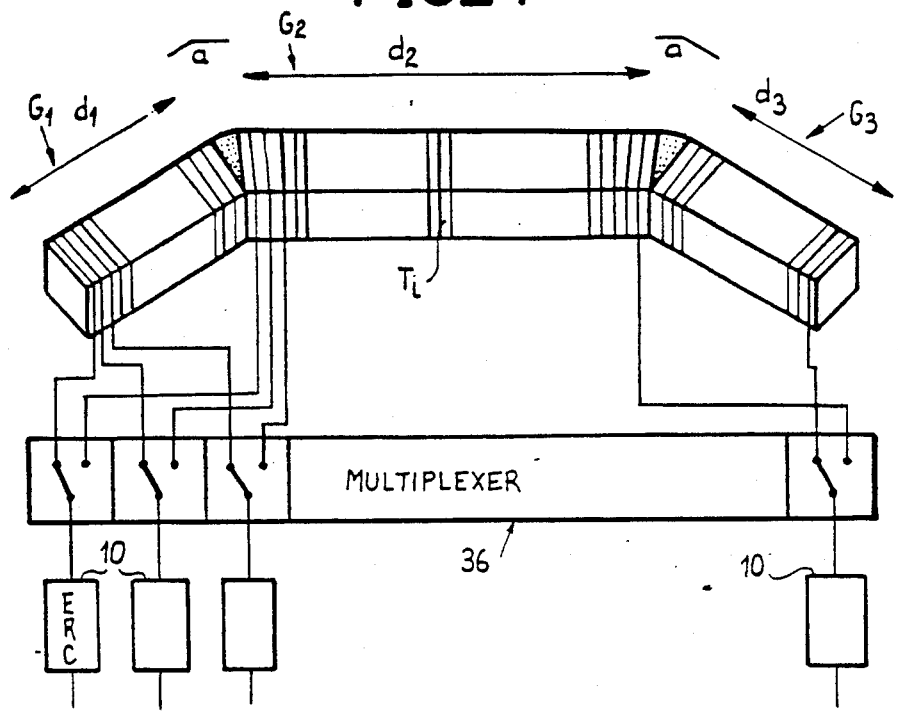
FIG_4
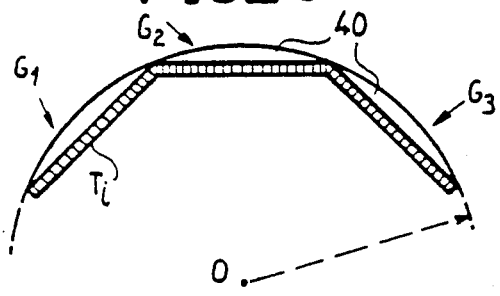
FIG_5
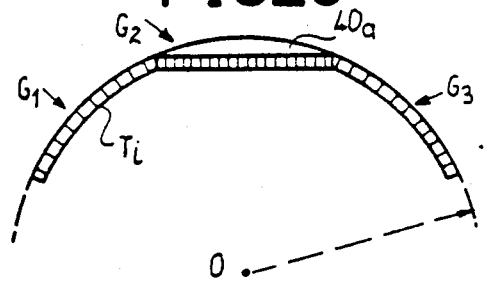
FIG_6

ULTRASONIC SENSOR FOR ELECTRONIC SECTORIAL SCANNING AND ECHOGRAPH INCORPORATING SUCH A SENSOR

BACKGROUND OF THE INVENTION

1. Field of the Invention

The invention concerns an ultrasonic depth sounder or sensor with sectorial electronic scanning utilizing the sound emission technique generally known under the name of "phased array", where a single group of transducer elements is excited at each emitting-receiving sequence with predetermined delays between the transducer elements of the group. The invention also concerns an echograph incorporating a novel type of sounder or sensor.

2. Description of the Prior Art

A known echograph with electronic sectorial scanning comprises a sounder or sensor incorporating an array of distinct transducer elements aligned according to a relatively short straight segment. By way of example, the dimensions of the bar or strip of piezo electric transducer elements are currently 20 mm long and about 15 mm wide. The number of transducer elements is generally smaller than 100 and more often comprises between 30 and 70. As compared with strip systems comprising a higher number of elements and among which a different group of transducer elements is selected at each emitting-receiving sequence, all the transducer elements of the group of this known echograph are called at each emitting-receiving sequence. The transducer elements are excited with predetermined delays between them, and then the total of the echos perceived by these same elements is calculated, preferably by applying the same lag or delay law to these echos. Upon transmitting, the delay law conditions both the orientation of the ultrasonic beam and the focussing characteristics of this beam. Upon receiving, the same lag or delay law applied between the different signal processing channels prior to their addition, creates a dynamic focalization and privileges the reception according to a certain direction. It can thus be conceived that the electronic part of this type of echograph is very complex and expensive. Furthermore, it is very difficult to achieve a correct scanning on a wide angular sector. In fact, the greater the slope angle with respect to the piezo electric strip materializing the transducer element grouping, the greater must be the delays between the elements. By way of example, a beam deflected by 45° with respect to the emitting plane of the strip requires delays which must be able to reach ten microseconds. The value of these delays must be controlled with great accuracy, of about 20 nanoseconds. Realizing these delays raises complicated technical problems. Furthermore, it has been observed that the sensitivity of a piezo electric element rapidly decreases upon reception, when the angle of incidence of the corresponding beam increases.

SUMMARY OF THE INVENTION

The aim of the invention is to overcome these drawbacks by proposing, on the one hand, a novel sensor structure providing the ability to reconstitute an image from angular scannings having relatively small openings, and on the other hand, an echograph incorporating such a sensor.

More specifically, the invention concerns an ultrasonic sensor for electronic sectorial scanning comprising at least one array of transducer elements, wherein it comprises several groups of transducer elements respectively aligned according to consecutive portions of a convex outline toward an element to be scanned, each portion being distinguished from an adjacent portion by a discontinuity and/or a different radius of curvature.

Of course, the radius of curvature of one given outline portion can be infinite, which means that the transducer elements of the corresponding group are aligned according to a straight portion. According to the most simple embodiment, the sensor thus comprises two adjacent groups aligned, for example, according to straight or curved line portions (or a straight and a curved line) forming between each other a certain angle.

Another embodiment that will be described in detail herein-below comprises at least three above-mentioned groups of transducer elements aligned according to consecutive straight line portions, forming between one another equal obtuse angles.

According to a particularly simple embodiment, the sensor comprises at least three above-mentioned groups aligned according to consecutive straight line portions, forming between one another equal obtuse angles.

Therefore, the different groups of transducer elements, differently oriented, can be allocated to the sound of adjacent angular sectors in the plane of a cross-section to be visualized, these angular sectors having relatively small openings (thus requiring comparatively smaller delays) the juxtaposition of which on visualizing means reconstitutes a wide field image. It should be noted that the total number of transducer elements is practically identical to that which would be necessary (with laws of delay that are technically more difficult to achieve) to return a comparable wide field image, from a single linear strip. The dimensions of the sensor are also closely similar (or more often smaller), which is an important criteria for certain types of examination.

The fact that the number of transducer elements is not higher that in the past has other consequences upon the associated processing electronic:

- if one emitting-receiving channel is made to correspond to each transducer elements, the complexity of the echograph is the same as in the prior art, but it is possible to control each group independently and the image change can thus be multiplied by the number of groups.
- on the contrary, for a single rate change, relatively inexpensive multiplexing means allow to divide the number of emitting-receiving channels by the number of above-mentioned transducer element groups, thereby allowing a further considerable reduction in installation costs.

The invention also concerns an echograph comprising a sensor with electronic sectorial scanning, wherein this sensor comprises several groups of transducer elements aligned according to consecutive portions of a convex outline, and wherein it comprises emitting-receiving means for organizing the emitting-receiving sequences from at least one group of transducer elements, the said emitting-receiving means comprising a number of emitting-receiving channels at least equal to the number of transducer elements of one of the groups and each sequence performing a predetermined law of delays between the transducer elements of the said group, determining a directivity and a focussing that are given upon emission and preferably a focussing upon reception.

BRIEF SUMMARY OF THE DRAWINGS

The invention will be better understood and objects, advantages and features thereof will become more apparent from reading the following description, given way by of non-limitative example and with reference to the appended drawings in which:

FIG. 1 is a block diagram of the essential elements of an echograph according to the invention;

FIG. 2 represents schematically in perspective a sensor according to the invention, and in the form of a block-diagram, the essential elements of an echograph provided with a said sensor;

FIG. 3 is a similar view to that represented in FIG. 2, illustrating a variant of execution;

FIG. 4 is a view similar to that represented in FIG. 2, illustrating another variant of execution;

FIG. 5 is a schematic outline view of an ultrasonic sensor according to the invention which can be utilized instead of the sensor represented in FIGS. 2 to 4; and FIG. 6 is a schematic outline view of another ultrasonic sensor according to the invention which can be utilized instead of the sensor represented in FIGS. 2 to 5.

DESCRIPTION OF THE PREFERRED EMBODIMENT OF THE INVENTION

FIG. 1 partially represents a possible disposition of the emitting-receiving means of an echograph that can be utilized with an ultrasonic sensor according to an embodiment of the present invention. The diagram shows more particularly an emitting-receiving channel 10 associated to one of the piezo electric transducer elements $T_i$ of one of the groups constituting the sensor. This transducer element is connected to a transmitter 11 which transmits an ultrasonic impulse at the selected frequency to the transducer at each emission. It is also connected to a amplifier 12 which amplifies the echoes subsequently receiving through this same transducer. Furthermore, form shaping means 13 (trigger, for example) for a control impulse are connected to the input of an adder 14 that also receives at its other input the output signal of the amplifier 12. The output of the adder 14 is connected to the input of a first delay line 15, the outputs of which are respectively connected to the inputs of a first multiplexer 16. The output of this multiplier 16 is connected to the input of a second delay line 18, the outputs of which are respectively connected to the inputs of a second multiplexer 19. The "available" delays at the outputs of the delay lines 15 and 18 differ in order of magnitude, so that it is possible to obtain any delay (within the range of delays necessary for obtaining the desired sectorial scanning) and with the required accuracy, by addressing multiplexers 16 and 19, each selecting an output of the corresponding delay line.

The output of the multiplexer 19 is connected, on the one hand, to the input of a SOM amplifier-adder, receiving on other inputs the delayed signals issuing from other analog emitting-receiving channels. The output of multiplexer 19 is also connected to the release input 22 of an impulse generator 23, which triggers an excitation pulse from the transmitter 11, at each emission. This pulse is delayed by a desired time period with respect to the pulse delivered by the form shaping means 13, this time period being determined by the state of the multiplexers 16 and 19. The control software determines the duration of the excitation impulse through a control link 24 between the microprocessor-sequencer 26 and generator 23. This microprocessor-sequencer 26 and an associated programmed read-only memory 27 (PROM type) constitute the essential control software of the different channels 10. The microprocessor therefore controls an address generator 30 that commands the two multiplexers 16 and 19 of each channel (addressing links 31 and 32). This same microprocessor is linked up to the memory 27 in order to select from said memory reading of the instructions corresponding to a given sequencing resulting from the combination of the parameters chosen by the operator, especially the ultrasonic frequency. Taking into account these parameters, the processor organizes the reading of a certain number of instructions from the programmed read-only memory program, controlling the rate of the ultrasonic "firings" or emissions, their orientations (i.e. the corresponding delay laws) in order to determine the electronic sectorial scanning, the waiting time between "firings", etc.

In order to excite a transmitter 11, the processor 26 transmits a firing order transmitted by the link cable 35 to form shaping means 13. This order is delayed in function of the prior positioning of the multiplexers 16 and 19 from the corresponding emitting-receiving channel 10. This order actuates or triggers the impulse generator 23 that excites the transmitter 11 during a time period that is controlled by the control software. Upon reception, the echoes collected by the same transducer element $T_i$ are applied to the input of the amplifier 12 and directed towards the whole of the delay lines 15, 18 in order to undergo the same delays prior to being applied to the corresponding inputs of the SOM amplifier-adder, thus realizing a focalization upon reception. The output signals of the SOM amplifier-adder are processed (in particular by a window device) prior to being utilized as video signals of a television receiver upon which the image is reconstituted line by line in several adjacent angular sectors corresponding to the number of transducer element groups defined within the sensor.

FIG. 2 illustrates a possible embodiment of an ultrasonic sensor according to the invention, intended for operating with the system represented in FIG. 1. According to the example, the sensor comprises three groups G1, G2 and G3 of transducer elements $T_i$ aligned according to consecutive straight line portions d1, d2 and d3, and forming obtuse angles between one another equal.

In the example represented in FIG. 2, each group G1, G2 or G3 comprises the same number of transducer elements and each transducer element $T_i$ is linked to a emitting-receiving channel 10 according to FIG. 1. However, the outputs of the channels corresponding to the elements of each group are connected respectively to the inputs of three amplifiers-adders SOM₁, SOM₂ and SOM₃, so that the output signals of these three amplifiers can be utilized simultaneously. In this embodiment, the means for controlling the emitting-receiving channels (i.e. essentially the processor 26 and the programmed read-only memory 27) are disposed and programmed so as to provoke substantially and simultaneously an emitting-receiving sequence in each group. In other words, the system provokes three ultrasonic firings simultaneously, each emission being carried out by all the elements of a group G1, G2, G3 by associating each time to each group a predetermined law of delays, defining both the focal characteristics of the emitted ultrasonic beams and its orientation with respect to the emitting surface of the corresponding group. The signals collected by the transducer elements of each group are delayed with respect to one another by applying the same laws of delay prior to being added by the corresponding amplifier-adder SOM1, SOM2 or SOM3.

The output signals of these amplifiers are processed in a conventional way in order to elaborate three distinct video signals applied substantially and simultaneously to a television monitor (not represented) in order to modulate three scanning lines being registered respectively in three adjacent sectors of the picture. It will be noted that the effect of this operation is to multiply the rate of the pictures or images by the number of groups, without substantially increasing the complexity of the associated electronic circuits, since the number of transducer elements is approximately equal to that of a linear strip operating in "phased array". By way of example, such a conventional linear strip requires 64 transducer elements in order to electronically scan an angular sector of 90°, with important delays for certain transducer elements. With the system of FIG. 1, the same angular sector is swept three times more rapidly through association of three adjacent angular sectors of 30° each scanned by a group G1, G2 or G3 of 22 transducer elements, i.e. a total of 66 emitting-receiving channels 10. The lag or delay laws concerning each group apply much lower delay values and thus the delay lines are easier to build with the required accuracy, and subsequently less expensive.

With the embodiment represented in FIG. 2, it is possible to obtain a wide aperture angular image. It is indeed possible to allocate to each group a scanning of 45°, i.e. a total aperture of 135°. If an inter-element interval equal to the wave-length of the ultrasound and 32 elements per group have been chosen, the width of one group is 16 mm for an operating frequency of 3 MHz and the whole of the emitting surface of the sensor is comprised within a mean radius of 22 mm. The associated echograph, of course, comprises 96 emitting-receiving channels. In order to prevent or limit the interferences between the echoes issuing from the firings simultaneously carried out from the three groups, it is advantageous to select lag or delay laws so that the directions of the three firings always form angles of 45° with respect to one another.

FIG. 3 represents another embodiment for which the image change is identical to that of a conventional system, but with three times fewer electronic processing circuits. The sensor itself is the same as described hereinabove, i.e. each group G1, G2 and G3 comprise the same number of transducer elements. However, the emitting-receiving means in this embodiment only comprise a number of emitting-receiving channels 10 equal to the number of transducer elements of a group, whereas the sequential switching operation means, in the form of a multiplexer 35, are intercalated between groups G1, G2 and G3 and the emitting-receiving channels 10 (only 22 in number in the example described, the signal outputs of these channels being connected to a single amplifier-adder SOM) in order to interconnect cyclically and in a given order, the transducer elements $T_i$ of the groups and the said emitting-receiving channels 10. More precisely, the multiplexer 35 is, for example, constituted by a plurality of analog gates connected in such a way as to comprise three inputs for one output. These inputs are interconnected to the sensor so as to regroup the output cables of the homologous transducer elements of each group towards a single multiplexing output connected to a single emitting-receiving channel 10. The processor 26 and the memory 27 control, for example, the multiplexer in the following way. During a first phase, all the elements of group G1 are connected to the emitting-receiving channels 10 during the whole emitting-receiving sequence time period ensuring a first scanning of a sector of 30°. Then the group G2 replaces the group G1 through switching over of the multiplexer and the transducer elements of groups G2 are connected to the emitting-receiving channels during the time required for a second scanning of a sector of 30° adjacent to the preceding one. Thereafter the whole of the elements of group G3 is connected to the same emitting-receiving channels long enough for a third scanning of an adjacent sector of 30° to be carried out.

Other variants are possible, as for example those represented in FIG. 4 in which the sensor has been modified so that the two lateral groups G1 and G3 situated symmetrically on either side of a central group G2 each comprise a number of transducer elements equal to half the number of transducer elements of the said central group. This disposition presents certain advantages when it is desired that the central zone of the picture be of high quality while maintaining a wide angular field, the lateral zones thus acting above all as reference zones. By way of example, the central groups G2 can cover an angular field of 30° only and comprise 64 transducer elements whereas the lateral groups G1 and G3 can each cover an angular field of 45° but only comprise b 32 elements per group. Sequential switching means, in the form of a multiplexer 36, are intercalated between the sensor and the emitting-receiving means of the echograph, which means thus comprise as many emitting-receiving channels 10 as the central group G2 comprises transducer elements $T_i$. This multiplexer 36 comprises two inputs for one output per switching unit. The inputs are linked to the sensor in order to connect one after the other and cyclically the output cables of the transducer elements of the central group G2 to the different emitting-receiving channels 10, then the output cables of the transducer elements of the lateral groups G1 and G3 with these same emitting-receiving channels 10. The successive switching operations of the multiplexer are controled by the command software of the echograph comprising essentially the processor 26 and the programmed read-only memory 27.

FIG. 5 represents schematically and as an outline a sensor identical to that represented in FIG. 2 in which the three emitting faces of the groups G1, G2 and G3 are embedded in a layer 40 of material, for example an elastomeric material, materializing a continuous external surface of constant radius of curvature in the plane of the area to be visualized, i.e. the plane of the drawing. This feature is applicable to all the sensors described herein-above. It is also possible to modify the sensor according to the representation given in FIG. 6 in which it comprises a central group G2 of transducer elements aligned according to a straight line portion and two lateral groups G1 and G3 in which the transducer elements are disposed according to curved line portions, and more specifically here, according to arcs of a common circle having a centre 0. Of course, a layer of elastomeric material 40a can be disposed upon the surface of the central group G2. In this case, the convex external surface of the layer of elastomeric material materializes a convex external surface of constant radii of curvature and of centre 0, being connected in a continuous manner to the curved emitting surfaces of the groups G1 and G2. The elastomeric material thus disposed has a "lens" effect, thereby procuring an average focussing in the direction perpendicular to the picture plane. The inverse arrangement to that shown in FIG. 6 can also produce good results. In this case, the two lateral groups G1, G3 would have their transducer elements disposed according to the straight portions and the central group G2 would have its elements disposed according to a curved portion, for example, the arc of a circle, the elastomeric material mentioned hereinabove covering the emitting surfaces of the transducer elements of the groups G1 and G3.

I claim:

1. An ultrasonic sensor for electronic sectorial scanning, comprising: a plurality of groups of transducer elements formed into consecutive portions which are respectively aligned to present a convex outline to an object of scanning, each portion being distinguished from its adjacent portion by at least one of a discontinuity and a different radius of curvature.

2. Ultrasonic sensor according to claim 1, wherein it comprises two adjacent groups aligned according to a predetermined angle forming between one another.

3. Ultrasonic sensor according to claim 1, wherein it comprises at least three groups aligned according to consecutive straight line portions forming equal obtuse angles between one another.

4. Ultrasonic sensor according to claim 1, wherein it comprises a first group of transducer elements aligned as a straight line portion and second and third groups of transducer elements disposed as curved line portions, said second and third groups being situated symmetrically on both sides of said first group of elements.

5. An ultrasonic sensor as in claim 4 wherein said curved line portion defines an arc of a circle.

6. An ultrasonic sensor according to claim 1, wherein it comprises a first group of transducer elements disposed according to a curved line portion and second and third groups of transducer elements disposed according to straight line portions, said second and third groups being situated symmetrically on both sides of said first group.

7. An ultrasonic sensor according to claim 1, wherein the emitting faces of at least one group of aligned transducers according to a straight line portion are embedded in a layer of elastomeric material materializing a continuous convex external surface having a constant radius of curvature in the plane of the area to be visualized.

8. An ultrasonic sensor according to claim 1 further comprising sequencing means for independently controlling operations of each of said groups.

9. A sensor as in claim 8 wherein said sequencing means causes all of the transducer elements of a particular group to simultaneously operate.

10. A sensor as in claim 9 further comprising:
means for receiving a signal from a transducer element;
delay means, coupled to said receiving means, for delaying said received signal in a plurality of discrete delay increments and for providing a plurality of discrete delay outputs; and
multiplexing means coupled to said plurality of discrete delayed outputs of said delaying means, for selecting one of said discrete delayed outputs of said delay means as an output of said multiplexing means.

11. An echograph comprising a sensor with electronic sectorial scanning comprising:
a plurality of groups of transducer elements aligned to present a convex outline to an object to be scanned;
emitting-receiving means for organizing emitting-receiving sequences from at least one group of transducer elements, said emitting-receiving means comprising a number of emitting-receiving channels at least equal to the number of transducer elements of one of said groups; and
means for applying a predetermined delay between the transducer elements of said one group.

12. Echograph according to claim 11, wherein each group comprises the same number of transducer elements, wherein the said emitting-receiving means comprise a number of emitting-receiving channels equal to the number of transducer elements of each group and further comprising sequential switching means, intercalated between said groups and said emitting-receiving channels for cyclically and in a given order interconnecting the transducer elements of said groups and said emitting-receiving channels.

13. Echograph according to claim 11, wherein each group comprises the same number of transducer elements, wherein the said emitting-receiving means comprises a number of emitting-receiving channels equal to the total number of transducer elements of all of the groups combined, and further comprising control means for said channels, disposed so as to provoke substantially and simultaneously an emitting-receiving sequence in each group.

14. Echograph according to claim 11, wherein the sensor comprises a central group of transducer elements, and two lateral groups on both sides of the central group, each said lateral group comprising a number of transducer elements equal to half the number of transducer elements of said central group, wherein the said emitting-receiving means comprises a number of emitting-receiving channels equal to the number of transducer elements of the central group, and further comprising sequential switching means, intercalated between said groups and said emitting-receiving channels for one by one and cyclically interconnecting said channels with said transducer elements of said central group and then with said transducer elements of the lateral groups.

15. An ultrasonic sensor according to claim 11 wherein said emitting-receiving means independently controls each of said groups.

16. A sensor as in claim 15 wherein said emitting-receiving means causes all of the transducer elements of a particular group to simultaneously operate.

17. A sensor as in claim 15
wherein said delaying means delays said signal in a plurality of discrete delay increments and provides a plurality of discrete delay outputs; and further compromising
multiplexing means coupled to said plurality of discrete delayed outputs of said delaying means, for selecting one of said discrete delayed outputs of said delay means as an output of said multiplexing means.

* * * * *